Aug. 2, 1960 M. S. ULSTAD ET AL 2,947,861

DIVERSITY COMBINER CONTROL SYSTEM

Filed Sept. 29, 1958 2 Sheets-Sheet 1

INVENTORS
MEREDITH S. ULSTAD
HOWARD D. HERN
BY Moody and Goldman
ATTORNEYS

DIVERSITY COMBINER CONTROL SYSTEM

Filed Sept. 29, 1958 2 Sheets-Sheet 2

INVENTORS
MEREDITH S. ULSTAD
HOWARD D. HERN
BY Moody & Goldman
ATTORNEYS 2,947,861

DIVERSITY COMBINER CONTROL SYSTEM

Meredith S. Ulstad and Howard D. Hern, Cedar Rapids, Iowa, assignors to Collins Radio Company, Cedar Rapids, Iowa, a corporation of Iowa Filed Sept. 29, 1958, Ser. No. 763,928

8 Claims. (Cl. 250—20)

This invention relates to combiner circuits for diversity-operated angular-modulation receivers. The invention is particularly applicable to diversity arrangements of variable-threshold angular-modulated receivers of the type described in patent application No. 696,473 by Howard D. Hern, filed November 14, 1957, titled "Method and Means for Reducing the Threshold of Angular-Modulation Receivers," and assigned to the same assignee as the present application.

Prior diversity combiners are known which simultaneously combine outputs of F.M. receivers on a weighted basis according to ratios of detected noise obtained from respective noise channels, that select noise-energy in noise-frequency bands above the signal-frequency band. In order to provide a noise-energy band above the signal band at the output of a discriminator, it is neceessary in prior systems to provide an I.F. bandwidth sufficiently wide to accommodate the required noise for proper diversity combining.

In a variable-threshold receiver of the type in the above-cited application No. 696,473, the I.F. bandwidth available near minimum threshold cannot accommodate sufficient noise-energy components outside the signal-frequency band for proper diversity combination. In variable-threshold receivers, a resulting fluctuation in I.F. bandwidth under low signal conditions annihilates the proportionality between the detected noise and the required combining function. The invention does not use noise-energy components for obtaining weighting signals used in controlling a diversity combiner.

It is therefore an object of this invention to provide a signal combiner which will operate with variable-threshold angular-modulation receivers.

It is a further object of this invention to provide a diversity combiner that is compatible with F.M. receivers with fixed I.F. bandwidths.

It is another object of this invention to provide a diversity combiner which does not require a second power source for the return current in a cathode-follower adding circuit.

It is still another object of this invention to provide a diversity combiner which prevents noise feed-through by any given receiver when it is below threshold, while another receiver in the diversity arrangement is above threshold.

The invention is used with a plurality of receivers which are arranged for either space or frequency diversity reception. Each of the receivers includes means for heterodyning a received signal to an I.F. frequency. A logarithmically-limiting I.F. amplifier respectively receives the output of each receiver. A weighting-signal generator is connected to stages of the I.F. amplifier to logarithmically detect the received signal and provide the weighting signal. F.M. discriminators are connected respectively to the outputs of the limiting I.F. amplifiers to detect the received signal simultaneously.

A unique load is provided with a cathode-follower type of combiner to permit the elimination of a negative power supply for the cathode-follower current return. The load consists of a fixed-biased transistor, which provides a low resistance to direct-current, but provides a very high impedance to signal-frequency alternating-currents enabling a maximum amount of degeneration that is needed for optimum combiner action.

The weighting signal is provided to the cathode follower to control its bias.

When any F.M. receiver is below threshold, its limiter is captured by noise, which becomes the strong output of its discriminator. A noise-cutoff circuit with each discriminator prevents feed-through of noise to the combiner when the respective receiver drops below threshold. The noise cutoff circuit includes a phase-splitter which divides a respective discriminator output into two parts of opposite phase. One part is connected to the grid of the respective cathode-follower, and the other part is connected to the cathode of the same cathode-follower. Cancellation of the discriminator output occurs in the cathode-follower only when its grid is biased below cutoff by disconnecting the weighting signal.

The weighting-signal disconnect circuit is provided to drive the respective cathode-follower far below cutoff when a respective receiver is below threshold. The disconnection is required because the weighting signal does not appreciably drop-off below threshold due to captured noise. The weighting-signal disconnect circuit is also operated by a control signal derived from the logarithmic I.F. amplifier. The threshold-control-signal in variable-threshold receivers may be used, since it must change appreciably when the signal approaches threshold. The weighting-signal disconnect circuit comprises a direct-current amplifier that receives, amplifies, and may change the potential level and polarity of the threshold-control signal before applying it as a bias to the control grid of a respective cathode follower.

Further objects, features, and advantages of the invention will be apparent to a person skilled in the art upon further study of the specification and the accompanying drawings, in which.

The drawings are now considered for an explanation of an embodiment of the invention.

Figure 1:
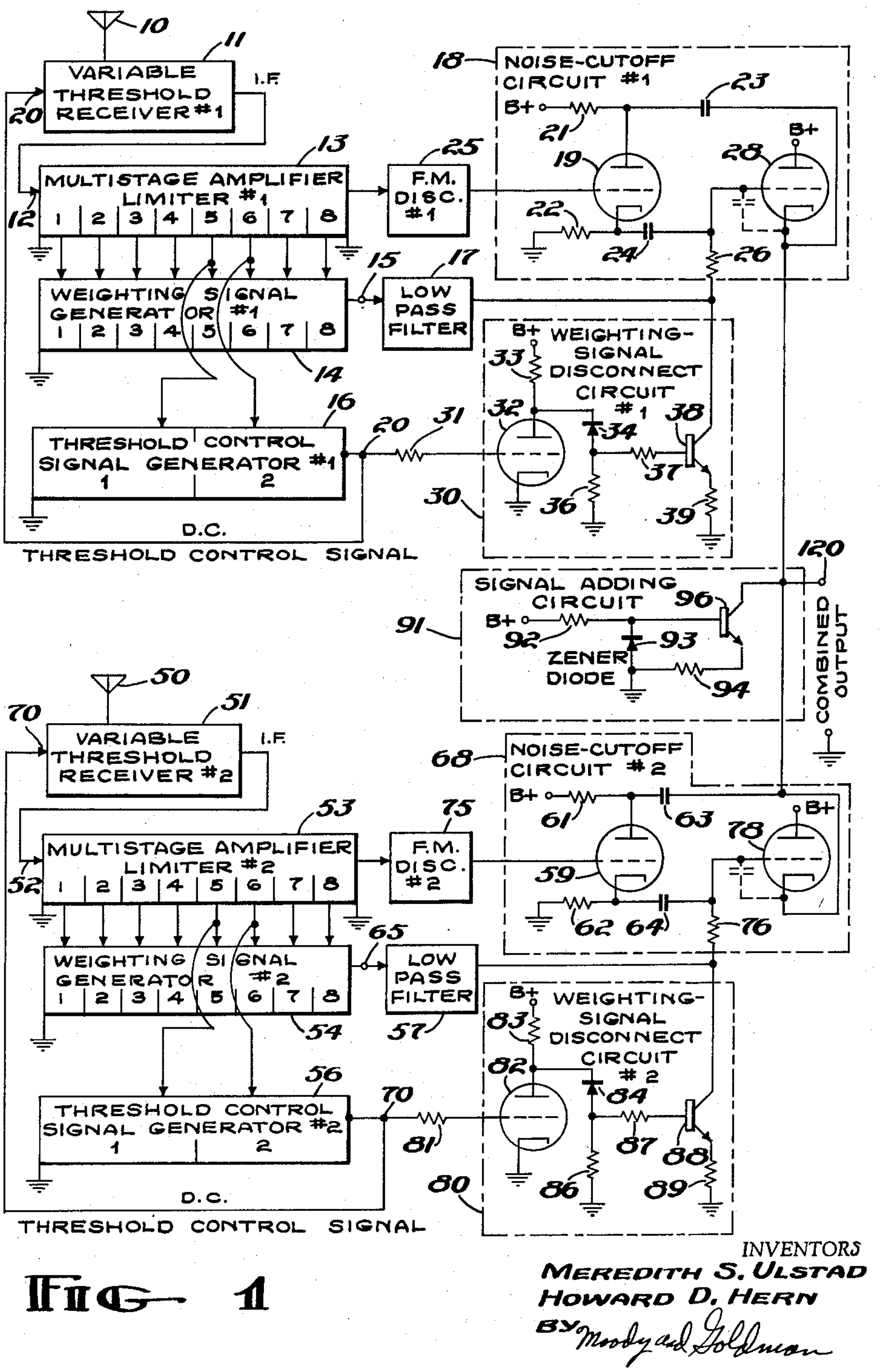
Figure 1 illustrates a form of the invention.

In Figure 1 a dual-diversity system is illustrated. It will become obvious after the specification is studied that the invention can be used with diversity systems having any number of receivers. The two receivers in the system of Figure 1 are identical, and therefore it is only necessary to describe one in detail. Thus, the receiver system comprising items 10 through 39 is identical to the receiver system comprising items 50 through 89.

The diversity system in Figure 1 is presumed to be a space-diversity system, wherein antennas 10 and 50 are spaced from each other so that multipath fading by the signal received by one of them does not have a high degree of correlation to the fading by the signal received by the other. However, the invention is just as applicable to frequency diversity.

A variable-threshold receiver 11 of the type described in above-cited application Serial No. 696,473 is connected to antenna 10 and heterodynes the received signal to an I.F. frequency level, which is provided at its output.

A multi-stage I.F. amplifier and limiter 13 receives the output of receiver 11. Limiter 13 comprises eight stages of serially-connected amplitude-limiting circuits, each stage having a unique limiting range. The last stage #8 limits on the lowest antenna signal level and the other stages limit at consecutively higher antenna signal levels, until stage #1 limits only the highest level signals. Each of the limiter stages has the same gain, prior to limiting by it; and they peak limit within successive ranges of received signal level.

A frequency-modulation discriminator 25 receives the amplitude-limited output of amplifier 13 and detects the signal carried by the received wave.

A noise-cutoff circuit 18 receives the detected signal from discriminator 25. Circuit 18 includes tube 19 connected as a phase-splitting circuit. It has resistors 21 and 22 respectively connected as plate and cathode load resistors. The signal is therefore provided in opposite-phased parts from the plate and cathode of tube 19. The in-phase part is coupled through a blocking capacitor 24 to the grid of cathode-follower tube 28. The phase-inverted part is coupled through a capacitor 23 to the cathode of tube 28. The level of the cathode signal applied through capacitor 23 is made equal to the level of signal coupled from grid-to-cathode through the interelectrode capacitance of the tube. Thus, the value of capacitor 23 and/or resistor 21 is chosen to control the proper signal level to the cathode. The noise-cutoff functioning of this circuit is explained below.

The cathode outputs of tubes 28 and 78 of circuits 18 and 68 are combined across a signal-adding circuit 91. Circuit 91 comprises an NPN transistor 96, which has its emitter connected to ground through a resistor 94 and its collector connected to the cathodes of both tubes 28 and 78. A resistor 92 connects a B-plus voltage source to the base of transistor 96; and a Zener diode 93 is connected between the base and ground. Diode 93 maintains a fixed bias between ground and a base of transistor 96.

Figure 4:
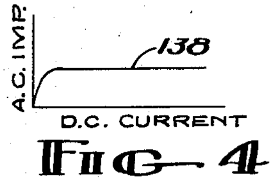

The added output is provided at a terminal 120 and is taken from the collector of transistor 96. Figure 4 illustrates the relationship between the direct-current flow and the alternating-current impedance provided by transistor 96. This load characteristic provided by transistor 96 obtains a uniquely efficient cathode-follower function. The low direct-current resistance absorbs only a small amount of power from the direct-current source and eliminates the need for a negative direct-current return source required with previous resistor loads. Furthermore, the very high alternating-current impedance provided by the transistor maintains a maximum amount of degeneration for each cathode-follower which is necessary for obtaining optimum signal combining.

Where the current load is large, two or more transistors, each being connected as transistor 96, can be connected in parallel. The emitter resistor 94 assists in maintaining the desired alternating-current impedance characteristic of transistor 96.

Antenna 50 receives the same transmitted signal as antenna 10, except that the fading characteristic of the received signal is different at the two antennas. Consequently, the same signal is detected by discriminators 25 and 75 of the two diversity receivers, except that the signal-to-noise ratios at the discriminator output vary in a random manner with fading. A weighting-signal output from a generator 14 will vary according to the received signal-to-noise ratio at a respective receiver, as long as the received signal is above minimum threshold. The weighting signal is a D.C. type of signal applied as a bias to the grid of a respective cathode follower to control its impedance to the detected signal. The greater the signal received by an antenna, the greater is the weighting signal provided from the respective generator 14, and the higher above cutoff is the respective cathode-follower tube driven. Vice versa, when the weighting signal of a respective receiver drops in value its cathode follower presents a correspondingly greater impedance to the signal on a logarithmic basis, as is determined by the logarithmic characteristic of generator 14.

Weighting-signal generator 14 is connected to respective stages of amplifier-limiter 13. The respective generator stages detect the outputs of the respective limiter stages and serially add them together on a direct-current basis. This provides a direct-current output from generator 14 which is logarithmically related to the above-threshold signal level received at I.F. input 12.

A low-pass filter 17 is connected to the output of generator 14 to attenuate noise and alternating-current components higher in frequency than the fluctuating direct-current signals, which should only be a function of the fading characteristic at antenna 10. The weighting signal is provided through low-pass filter 17 and an isolation resistor 26 to the grid of cathode follower 28 to control its bias.

Figure 3:
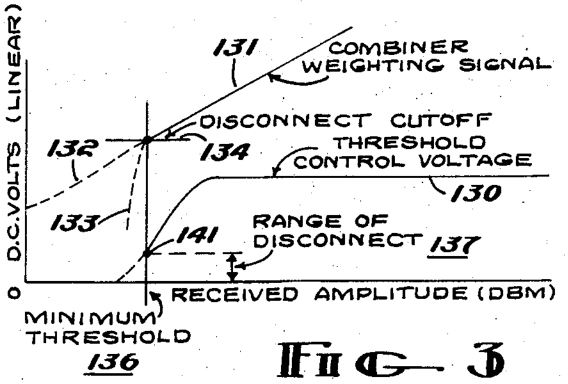
Figures 3 and 4 show curves used in explaining the operation of the invention.

Because of the diversity-receiver arrangement in Figure 1, it is most likely that when one receiver falls below its minimum threshold, the other receiver will be above minimum threshold to provide a useable signal. However, with the receiver below threshold, its limiter 13 captures noise rather than signal and provides a strong noise voltage output, which is undesirable but unavoidable under these circumstances. Under such circumstances it is essential that the captured noise of the below-threshold receiver not be transmitted to signal-adding circuit 91, since it would deteriorate the quality of the output signal. The weighting-control signal from filter 17 does not decrease sufficiently to drive its cathode-follower tube very much below cutoff. In Figure 3, line 131 represents a typical above threshold weighting signal, which is semilogarithmically linear (the abscissa only in Figure 3 is represented on a logarithmic basis) above the minimum threshold valve 136. Below the minimum input-threshold-signal level 136, the output voltage from weighting-signal generator 14 varies according to dashed line 132. Thus, the output voltage from generator 14 does not drop appreciably when the threshold recedes below minimum due to the noise components being captured in the limiter. Consequently, the change in weighting signal at minimum threshold is insufficient to properly cut off tube 28 to prevent any substantial feed-through of noise.

In order to provide a sharp cutoff bias for tube 28, disconnect circuit 30 is provided, which is controlled by threshold-control-signal generator 16. Disconnect circuit 30 acts, in effect, to ground the output of low-pass filter 17 when the input signal is below minimum threshold.

Threshold-control-signal generator 16 is provided with two stages, which are respectively connected to outputs of the fifth and sixth stages in amplifier-limiter 13. The stages of threshold generator 16 may be designed in the same manner as the stages of weighting generator 14, and they also will provide an approximate logarithmic response. Only two stages are used in threshold generator 16 because of the type of use for its output. A basic use for the output of generator 16 is to control the variable bandwidth of threshold receiver 11, as described in above-cited patent application No. 696,473. The choice of limiter stage #5 as a first input connection to generator 16 is determined for each receiver because peak limiting ceases in limiter stage #5 when the receiver input signal drops below its maximum threshold. Curve 130 in Figure 3 illustrates a typical response for the output voltage of threshold control generator 16.

During the substantially flat portion of curve 130, a receiver 11 is maintained at its maximum bandwidth to minimize intermodulation distortion. When the signal amplitude recedes below maximum threshold, the direct-current signal recedes below the knee of curve 130. As the signal further recedes in amplitude, the bandwidth of receiver 11 further decreases and the F.M. threshold of the system drops correspondingly. At some value of the threshold-control-signal, minimum bandwidth and threshold are reached within the receiver 11. Minimum-bandwidth point 141 is illustrated in Figure 3 at vertical line 136, which represents the minimum threshold level of the F.M. system. In practice, as much as a ten decibel range of threshold is provided between the minimum and maximum values. When the signal falls below minimum threshold level 136, the threshold control voltage varies according to the dashed line extension of curve 130.

The maximum threshold is determined by the maximum I.F. bandwidth within receiver 11. Thus, as long as the receiver is above maximum threshold, limiters #5 and #6 are peak limiting; and an output 20 of generator 16 is at a maximum direct-current level which maintains maximum bandwidth in receiver 11. However, when the input signal drops until the threshold recedes below maximum, the signal level within limiter #5 drops below clipping level; and the output voltage from generator 16 becomes lower to decrease the bandwidth within receiver 11 and to lower its F.M. threshold. When the signal drops still further in amplitude, the next limiter stage #6 eventually drops below its peak-clipping level; and the output of generator 16 continues to decrease the receiver bandwidth and the F.M. threshold. The output voltage of generator 16 drops at a steep rate with the input signal level below maximum threshold, and the generator 16 output voltage provides a positive indication when the minimum F.M. threshold of the receiver system is reached.

The output of generator 16 operates weighting-signal disconnect circuit 30, which includes a tube 32 that has its control grid connected through an isolation resistor 31 to generator output 20. Disconnect circuit 30 is basically a direct-current amplifier and potential-level changer. The D.C. amplified output of tube 32 is provided across a resistor 36, but the direct-current level of the output is dropped to a lower level by means of a Zener diode 34 connected between resistor 36 and the plate of tube 32. A transistor 38, which is NPN, has its base connected through a resistor 37 to a point between diode 34 and resistor 36. Transistor 38 has its emitter connected to ground through a resistor 39 and has its collector connected through a resistor 26 to the grid of a cathode-follower tube 28. The value of resistor 39 is chosen to provide a bias on the transistor to operate it in a common base manner rather than in a common-emitter manner, because of the higher A.C. impedance obtainable with the former manner. As the output of threshold generator 16 drops, the output of transistor 38 drops at a steep rate. The D.C. level is adjusted with respect to the normally-expected cutoff level of tube 28 so that when the generator 16 output indicates the minimum threshold is reached, tube 28 is disconnected by being biased far below cutoff by the voltage output of the disconnect circuit. At some D.C. bias, such as level 134 in Figure 3, tube 28 is driven below cutoff; and when the signal falls substantially below threshold 136, the bias is far below level 134 and tube 28 is far below cutoff. Thus, the threshold-control voltage, shown by curve 130 in Figure 3, switches transistor 38 to a very low collector-to-ground impedance, when it reaches the level represented by point 141 in Figure 3. Then, the grid of cathode-follower 28 is effectively grounded; and due to the high D.C. cathode voltage on tube 28, it is held far below cutoff. The drop in value of the weighting-voltage below threshold due to the operation of disconnect circuit 30 is represented by dotted line 133 in Figure 3.

The cutoff is also a function of the signal level at the output of the other receiver system, due to the parallel combination of the receivers with tubes 28 and 78 across circuit 91.

Nevertheless, even if a cathode-follower tube is below cutoff, there will be some noise passed to the output of the diversity system through the grid-to-cathode interelectrode capacitance of the tube. Noise-cutoff-circuit 18 prevents such extraneous feed-through. When tube 28 is below cutoff, the electron current in the tube is stopped; and the interelectrode coupling provides the only feed through from the grid. Consequently, this feed-through and the opposite-phased equal-level signal applied through capacitor 23 cancel in signal-adding circuit 91 and can not cause any noise output.

Figure 2:
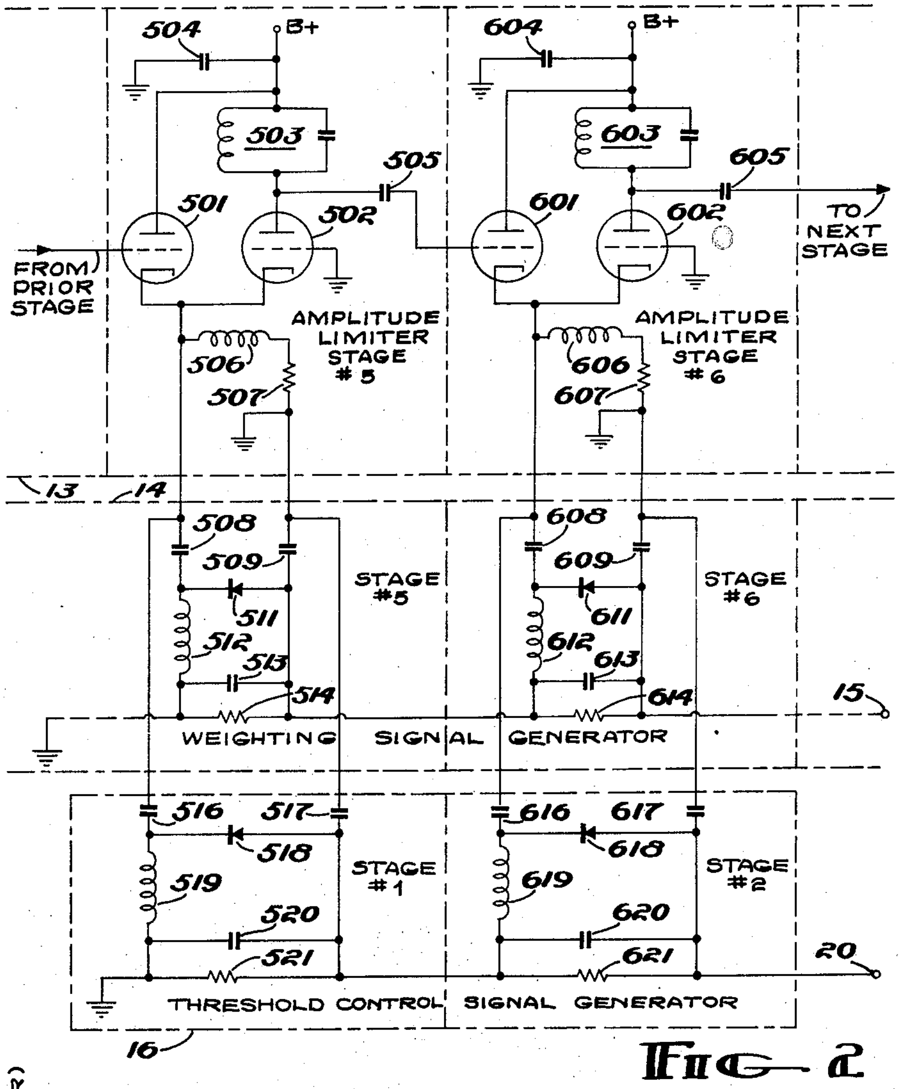
Figure 2 shows a schematic of one type of circuitry which may be used in some of the blocks illustrated in Figure 1.

Figure 2 illustrates a schematic diagram of some of the multiple stages used in I.F. amplifier-limiter 13 and generators 14 and 16, which have been found particularly suitable in practice. Since the stages of amplifier-limiter 13 may be identical, only one stage need be explained in detail. Thus in Figure 2, stage #5 comprises a pair of triodes 501 and 502 which act as amplifiers when the input signal is below a certain level and act as peak clippers when the input signal exceeds a given higher level. This type of amplifier-limiter stage is well known. Tubes 501 and 502 are cathode-coupled. Tube 501 is a cathode-follower, and tube 502 is a grid grounded amplifier which has its output provided to the next stage through a blocking capacitor 505 connected to its plate. Tuned circuit 503 is connected as the plate load of tube 502 and is a broadband I.F. filter. A cathode load is comprised of an inductance 506 and a resistor 507, that are connected between the common cathodes and ground. The cathode circuit has a low impedance which is particularly suitable for coupling to diode-detector types of circuits, which have low impedances. The other stages in amplifier-limiter 13 can be made in the same manner as described stage #5.

Stage #5 of weighting-signal generator 14 is comprised of a diode 511 which has its opposite ends connected through a pair of blocking capacitors 508 and 509 to opposite ends of the cathode circuit in limiter stage #5. A load resistor 514 in series with a choke coil 512 is connected across diode 511, and a capacitor 513 is connected across resistor 514. The direct-current component detected by diode 511 is provided through resistor 514; however, alternating-current components are blocked from resistor 514 by choke coil 512 and are by-passed by capacitor 513. The other stages within weighting signal generator 14 can be made in precisely the same manner as stage #5.

The load resistors of the stages, such as 514, 614, etc., are connected in series between ground and output terminal 15 of generator 14. Thus, D.C. addition occurs for the detected signals to provide a logarithmic response above threshold.

Each of the two stages within threshold-control-signal generator 16 in Figure 2 are constructed in precisely the same manner as stage #5 of weighting-signal-generator 14. Thus, stage #1 in generator 16 is also connected across the cathode circuit within limiter stage #5 through blocking capacitors 516 and 517. Hence stage #1 of generator 16 is in parallel with stage #5 of generator 14. In a like manner stage #2 of generator 16 is in parallel with stage #6 of generator 14. The load resistors 521 and 621 in generator 16 are connected in series between ground and output terminal 20.

Hence, stages #1 and #2 of generator 16 detect in the same manner as stages #5 and #6 in generator 14. However, the output of generator 14 has a different direct-current level than the combined outputs of the fifth and sixth stages of generator 14. Furthermore the stages of generator 16 are not influenced direct-current-wise by the signal levels in other stages. Hence, generator 16 has maximum response around the threshold range of the signal.

Although this invention has been described with respect to a particular embodiment thereof, it is not to be so limited as changes and modifications may be made therein which are within the full intended scope of the invention as defined by the appended claims.

We claim:

1. An angular-modulation diversity combiner system including at least a pair of variable-threshold receivers, a plurality of amplifier-limiters respectively connected in series with said receivers, each amplifier-limiter comprising a plurality of tandem-connected stages, a plurality of frequency-modulation discriminators respectively connected to the outputs of said amplifier-limiters, a plurality of logarithmic weighting-signal generators, each connected to stages of a respective amplifier-limiter, a plurality of threshold-control signal generators also respectively connected to some stages of said amplifier-limiters, an output of each of said threshold-control generators being connected to a respective receiver to vary its threshold, a plurality of noise-cutoff circuits, each including a phase-splitter connected to an output of a respective discriminator and providing opposite phased outputs, a plurality of cathode-followers each including a cathode and grid, with the cathode and grid of each respectively connected to the opposite-phased outputs of a respective phase splitter; a weighting-signal disconnect circuit including a direct-current amplifier and having an input connected to an output of said threshold-control signal generator, an output of each disconnect circuit being connected to the grid of a respective cathode-follower; a signal-adding circuit connected between ground and the cathode of each cathode-follower, and means connecting the output of each weighting-signal generator to the grid of a respective cathode-follower.

2. A combiner as defined in claim 1 in which said signal-adding circuit includes at least one transistor as a load, means connecting a collector of said transistor to the cathode of said cathode-follower, means connecting the emitter of said transistor to ground, and means for maintaining a fixed bias between ground and the base of said transistor.

3. A combiner system as defined in claim 1 in which said weighting-signal disconnect circuit includes at least one transistor having a base, emitter and collector, means connecting the collector of said transistor connected to the grid of a respective cathode-follower, means connecting the emitter of said transistor to ground, and a Zener diode connected between the base and an output of said direct-current amplifier.

4. A combiner system as defined in claim 1, said weighting-signal generators comprising a plurality of detectors having inputs connected to outputs of respective stages of one of said amplifier-limiters, said detectors being connected in series to provide the output of said generator, low-pass filtering means connected between the output of said generator and the grid of a respective one of said cathode followers; said threshold-control signal generator comprising at least one detector stage connected to an output of one of the stages of said amplifier-limiter to respond to the threshold condition of said receiver.

5. An angular-modulation diversity-combiner system including at least a pair of receivers receiving respective input signals, with respective modulation detectors for detecting the respective receiver outputs, a signal combiner comprising a plurality of cathode-followers having a common load, noise-cutoff circuits connected between the outputs of said detectors and respective cathode followers, each of said noise-cutoff circuits including a phase-splitter having opposite-phased outputs, each of said cathode-followers having a cathode electrode and a signal electrode respectively connected to the opposite-phased outputs, a plurality of logarithmic-detection means also respectively connected to said receivers to provide respective weighting-signal outputs proportional to the logarithm of the amplitude of the respective input signal to its receiver, said respective weighting-signal outputs being connected to the signal electrodes of the respective cathode-followers to control their currents.

6. A combiner system as defined in claim 5 in which said common load includes at least one transistor having base, emitter and collector, means connecting a collector of said transistor to the cathode electrode of each of said cathode-followers, resistive means connecting the emitter of said transistor to ground to bias it for common-base operation, and means for maintaining a fixed bias between ground and a base of said transistor.

7. A combiner as defined in claim 5, including a plurality of weighting-signal disconnect circuits, inputs of said disconnect circuits respectively connected to the weighting-signal outputs of said logarithmic-detection means, said disconnect circuits being respectively actuated in response to particular levels of said input signals, and means connecting outputs of said disconnect circuits respectively to the signal electrodes of said cathode-followers.

8. A combiner as defined in claim 7, wherein said weighting-signal disconnect circuit includes a transistor with a collector, base and emitter, the collector and emitter connected between the signal electrode of a respective cathode-follower and ground, a direct-current amplifier having an output connected to the base of said transistor, and means connecting an input of said direct-current amplifier to an output of said logarithmic-detection means.

References Cited in the file of this patent

UNITED STATES PATENTS

| | | |
|---|---|---|
| 2,364,952 | Crosby | Dec. 12, 1944 |
| 2,644,885 | Atwood | July 7, 1953 |
| 2,648,765 | Young | Aug. 11, 1953 |
| 2,835,799 | Day | May 20, 1958 |

OTHER REFERENCES

Proc. I.R.E., October 1955, pp. 1281–1289, "Diversity Reception in UHF Long Range Communications," Mack.